Patented Mar. 12, 1946

2,396,403

UNITED STATES PATENT OFFICE 2,396,403

THREAD AND GLASS CUTTING COMPOUND

James B. Williams, deceased, late of Houston, Tex., by Ethel C. Williams, administratrix, Houston, Tex.

No Drawing. Application October 12, 1943, Serial No. 505,968

1 Claim. (Cl. 252—49.3)

The invention relates to a thread and glass cutting compound of the type used on drills and thread cutting dies so as to facilitate the cutting operation.

In threading and glass cutting operations it is desirable to provide a compound which will facilitate the cutting operations, eliminate overheating of the drill and the material being worked upon and at the same time to have a liquid which will remain in a homogeneous form so that the pigment materials therein will not settle out.

It is therefore one of the objects of the invention to provide a thread and glass cutting compound which is in the form of a liquid emulsion wherein the solid pigment materials will remain in suspension in the carrier liquid.

Another object of the invention is to provide a thread cutting compound composed of paraffin, white lead, linseed oil and turpentine blended together in water as a carrier liquid.

Another object of the invention is to provide an improved method for mixing a thread and glass cutting compound.

Another object of the invention is to provide a thread cutting compound made up of an emulsion of water, white lead, paraffin, linseed oil and turpentine.

In practicing the invention one part of commercial form of paraffin will be melted in any suitable manner to a temperature slightly above its melting point. To this melted paraffin is added one part by weight of white lead so that by mixing the white lead is dissolved in the heated paraffin. To this mixture of one part of paraffin and one part of white lead by weight is added two parts by volume of linseed oil where the linseed oil is mixed into the heated mixture of the white lead dissolved in the paraffin. The composition thus formed is then removed from the source of heat and one-fourth as much turpentine as linseed oil is added and is mixed thoroughly therewith. The mixture is then permitted to cool completely to atmospheric temperature and is then stirred or agitated and an emulsion formed by the addition of water thereto in the ratio of about three to one. This forms a liquid which can be utilized in various cutting and milling operations, but which is particularly adaptable and efficient in thread cutting and glass cutting operations.

The formula is thus:

1 part by weight of paraffin
1 part by weight of white lead
Twice the volume of the melted paraffin and white lead of linseed oil
One-fourth as much turpentine as linseed oil.

What is claimed is:

A cutting compound for threads, glass and the like consisting of a liquid composed of one part by weight white lead dissolved in one part by weight of melted paraffin, twice as much linseed oil as the volume of melted paraffin and white lead, one quarter as much turpentine as linseed oil all formed into an emulsion with water at a ratio of one to three.

ETHEL C. WILLIAMS,
Administratrix of the Estate of James B. Williams, Deceased.